(12) United States Patent
Wu et al.

(10) Patent No.: US 10,727,915 B2
(45) Date of Patent: Jul. 28, 2020

(54) DATA PROCESSING METHOD AND TRANSMITTING DEVICE

(71) Applicant: Huawei Technologies Co., Ltd., Shenzhen (CN)

(72) Inventors: Yiqun Wu, Shanghai (CN); Yinggang Du, Shenzhen (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/402,897

(22) Filed: May 3, 2019

(65) Prior Publication Data

US 2019/0260439 A1 Aug. 22, 2019

Related U.S. Application Data

(63) Continuation of application No. PCT/CN2017/108401, filed on Oct. 30, 2017.

(30) Foreign Application Priority Data

Nov. 4, 2016 (CN) .......................... 2016 1 0978455

(51) Int. Cl.
*H04B 7/0456* (2017.01)
*H04W 72/04* (2009.01)
(Continued)

(52) U.S. Cl.
CPC ............. *H04B 7/0473* (2013.01); *H04B 7/06* (2013.01); *H04L 5/0016* (2013.01); *H04L 25/03929* (2013.01); *H04W 72/046* (2013.01)

(58) Field of Classification Search
CPC .. H04B 7/0456; H04B 7/0615; H04B 7/0689; H04B 7/06; H04B 7/0473; H04L 1/06;
(Continued)

(56) References Cited

U.S. PATENT DOCUMENTS 8,031,800 B2 * 10/2011 Tirkkonen ............ H04L 1/0618
  375/295
8,320,488 B2 * 11/2012 Lee ...................... H04B 7/0671
  375/219

(Continued)

FOREIGN PATENT DOCUMENTS

CN 102138287 A 7/2011
CN 104823384 A 8/2015
(Continued)

*Primary Examiner* — Khanh C Tran
(74) *Attorney, Agent, or Firm* — Leydig, Voit & Mayer, Ltd.

(57) ABSTRACT

This application relates to the mobile communications field, and in particular, to a data processing technology in a wireless communications system. A data processing method includes: generating, by a transmitting device based on a stream of bits, one layer of modulation symbol sequence that includes N modulation vectors, any modulation vector $A_i$ includes U modulation symbols, $U \geq 2$, $N \geq i \geq 1$, and N is a positive integer; and processing, by the transmitting device, the modulation vector $A_i$ using a matrix $B_i$ to generate a modulation matrix $y_i$, each modulation matrix includes T elements in a first dimension, T is a quantity of space domain resources, $T \geq 2$, and the modulation matrix $y_i$ is used to map the stream of bits stream onto the T space domain resources. According to the solutions provided in this application, space diversity can be implemented in code domain, so that transmission reliability is improved.

10 Claims, 8 Drawing Sheets

(51) Int. Cl.
*H04L 5/00* (2006.01)
*H04B 7/06* (2006.01)
*H04L 25/03* (2006.01)

(58) Field of Classification Search
CPC ............ H04L 5/0016; H04L 25/03942; H04L 25/03929; H04L 1/0618; H04L 5/0005; H04W 72/046
See application file for complete search history.

(56) References Cited

U.S. PATENT DOCUMENTS

| | | | |
|---|---|---|---|
| 2003/0072395 A1* | 4/2003 | Jia | H04L 1/0003 375/341 |
| 2005/0281322 A1* | 12/2005 | Lee | H04L 1/0668 375/146 |
| 2008/0037675 A1* | 2/2008 | Lin | H04B 7/0417 375/262 |
| 2009/0003466 A1* | 1/2009 | Taherzadehboroujeni | H04B 7/0669 375/260 |
| 2010/0034310 A1* | 2/2010 | Nam | H04L 1/0606 375/267 |
| 2011/0013615 A1* | 1/2011 | Lee | H04L 5/0023 370/344 |
| 2011/0134902 A1* | 6/2011 | Ko | H04B 7/0434 370/344 |
| 2011/0135033 A1 | 6/2011 | Ko et al. | |
| 2011/0158342 A1* | 6/2011 | Srinivasan | H04L 25/0212 375/285 |
| 2014/0019408 A1 | 1/2014 | Ryu et al. | |
| 2014/0169408 A1 | 6/2014 | Bayesteh et al. | |
| 2014/0169409 A1 | 6/2014 | Ma et al. | |
| 2015/0327095 A1 | 11/2015 | Kwak et al. | |
| 2017/0279515 A1 | 9/2017 | Wu et al. | |
| 2017/0338869 A1 | 11/2017 | Wu et al. | |

FOREIGN PATENT DOCUMENTS

| | | |
|---|---|---|
| WO | 2016090587 A1 | 6/2016 |
| WO | 2016090588 A1 | 6/2016 |

* cited by examiner

DATA PROCESSING METHOD AND TRANSMITTING DEVICE

CROSS-REFERENCE TO RELATED APPLICATIONS

This application is a continuation of International Application No. PCT/CN2017/108401, filed on Oct. 30, 2017, which claims priority to Chinese Patent Application No. 201610978455.X, filed on Nov. 4, 2016, both of which are hereby incorporated by reference in their entireties.

TECHNICAL FIELD

This application relates to the communications field, and more specifically, to a space diversity technology that is based on multiple access and that is in a wireless communications system.

BACKGROUND

With development of technologies, in technologies such as a sparse code multiple access (SCMA) technology or an orthogonal frequency division multiplexing (OFDM) technology, a plurality of terminal devices are allowed to share a same time-frequency resource for data transmission. That is, a transmitting device may perform coding and modulation on a to-be-transmitted stream of bits to generate a modulation symbol sequence, and send the modulation symbol sequence to a receiving device by using an air interface.

Currently, a multiple-input multiple-output (MIMO) technology is known, that is, the transmitting device and the receiving device may transmit data through a plurality of antenna ports, so as to improve a system capacity and transmission reliability. Therefore, it is expected to combine the multiple-input multiple-output technology with a multiplexing technology such as the sparse code multiple access technology or the orthogonal frequency division multiplexing technology, so as to further improve performance of a communications system.

How to combine the multiple-input multiple-output technology with the technology such as the sparse code division multiple access technology to improve system capacity and transmission reliability to the greatest extent is a problem that needs to be resolved urgently.

SUMMARY

According to a data processing method provided in embodiments of this application, a space diversity gain can be used in code domain, so as to improve communication reliability.

According to a first aspect, an embodiment of this application provides a data processing method. After processing a to-be-modulated stream of bits, a transmitting device generates one layer of modulation symbol sequence, and processes the generated modulation symbol sequence by using a matrix, to implement diversity processing.

The method includes: generating, by the transmitting device, one layer of modulation symbol sequence based on the stream of bits, where the modulation symbol sequence includes N modulation vectors, any modulation vector $A_i$ includes U modulation symbols, $U \geq 2$, $N \geq i \geq 1$, and N is a positive integer; and processing, by the transmitting device, the modulation vector $A_i$ by using a matrix $B_i$ to generate a modulation matrix $y_i$, where each modulation matrix $y_i$ includes T elements in a first dimension, T is a quantity of space domain resources, $T \geq 2$, and the modulation matrix $y_i$ is used to map the stream of bits onto the T space domain resources.

By mapping the one layer of modulation symbol sequence, the one layer of modulation symbol sequence can be sent through a plurality of antenna ports, so that a space diversity gain is generated in code domain, and transmission reliability is improved.

The foregoing matrices $B_i$ used for modulation vectors can be the same or can be different. Therefore, each modulation vector $A_i$ can be mapped in more diversified manners by using different matrices $B_i$, to adapt to different scenarios.

In a possible design, the modulation vector $A_i$ includes V non-zero modulation symbols. The matrix $B_i$ includes T element sequences in the first dimension. At least one of the T element sequences is a non-zero element sequence, and the non-zero element sequence is an element sequence that includes at least one non-zero element. The matrix $B_i$ includes V non-zero element sequences in a second dimension, and $U \geq V \geq 1$.

The processing, by the foregoing transmitting device, the modulation vector $A_i$ based on the matrix $B_i$ can be mapping the modulation vector $A_i$ based on the matrix $B_i$, so that the modulation symbol sequence can be corresponding to T space domain resources after mapping.

In a possible design, when the first dimension is a row and T=2, the transmitting device maps the modulation vector $A_i$ based on the matrix $B_i$, and $B_i$ is $$\begin{bmatrix} 1 & 0 \\ 0 & 1 \end{bmatrix} \text{ or } \begin{bmatrix} 0 & 1 \\ 1 & 0 \end{bmatrix}.$$

In another possible design, when the first dimension is a row and T=2, the transmitting device maps the modulation vector $A_i$ based on the matrix $B_i$, maps $A_j$ based on a matrix $B_j$, i is not equal to j, $N \geq j \geq 1$, and $N \geq 2$, where the $B_i$ is $$\begin{bmatrix} 0 & 1 \\ 0 & 1 \end{bmatrix},$$

and $B_j$ is $$\begin{bmatrix} 1 & 0 \\ 1 & 0 \end{bmatrix}.$$

In still another possible design, in addition to mapping the modulation vector $A_i$ based on the matrix $B_i$ and mapping the modulation vector $A_j$ based on the matrix $B_j$, the transmitting device further maps a modulation vector $A_m$ based on a matrix $B_m$, where m is equal to neither i nor j, $B_m$ can be $$\begin{bmatrix} 1 & 0 \\ 0 & 1 \end{bmatrix}$$

or $B_m$ can be $$\begin{bmatrix} 0 & 1 \\ 1 & 0 \end{bmatrix},$$

$N \geq m \geq 1$, and $N \geq 3$.

In the foregoing possible designs, the U symbols include at least one non-zero modulation symbol and at least one zero modulation symbol. In another possible design, the U modulation symbols may alternatively be non-zero modulation symbols.

According to a second aspect, an embodiment of this application further provides another data processing method. A biggest difference from the first aspect lies in that a transmitting device may generate a plurality of layers of modulation symbol sequences based on a stream of bits, and process the plurality of layers of modulation symbol sequences. The data processing method includes: generating, by the transmitting device, L layers of modulation symbol sequences based on the stream of bits, where each layer of modulation symbol sequence includes N modulation vectors, any modulation vector $A_i^l$ includes U modulation symbols, L is a positive integer and L≥2, N is a positive integer and N≥i≥1, U≥2, and l=1 ... L; and processing, by the transmitting device, the modulation vector $A_i^l$ by using a matrix $B_i^l$ to generate a modulation matrix $y_i^l$, where each modulation matrix includes T elements in a first dimension, T is a quantity of space domain resources, T≥2, and the modulation matrix $y_i^l$ is used to map the stream of bits onto the T space domain resources.

Compared with the data processing method in the first aspect, in the data processing method in the second aspect, the transmitting device may generate the plurality of layers of modulation symbol sequences based on the stream of bits, and process the plurality of layers of modulation symbol sequences.

In a possible design, the modulation vector $A_i^l$ includes V non-zero modulation symbols, and the matrix $B_i^l$ includes T element sequences in the first dimension, where at least one of the T element sequences is a non-zero element sequence, the non-zero element sequence includes at least one non-zero element, the matrix $B_i^l$ includes V non-zero element sequences in a second dimension, and U≥V≥1.

When the first dimension is a row and T=2, the transmitting device maps the modulation vector $A_i^l$ based on the matrix $B_i^l$, and $B_i^l$ is $$\begin{bmatrix} 1 & 0 \\ 0 & 1 \end{bmatrix} \text{ or } \begin{bmatrix} 0 & 1 \\ 1 & 0 \end{bmatrix}.$$

In another possible design, when the first dimension is a row and T=2, the transmitting device maps the modulation vector $A_i^l$ based on the matrix $B_i^l$, maps $A_j^l$ based on a matrix $B_j^l$, i is not equal to j, N≥j≥1, and N≥2, where the $B_i^l$ is $$\begin{bmatrix} 0 & 1 \\ 0 & 1 \end{bmatrix},$$

and $B_j^l$ is $$\begin{bmatrix} 1 & 0 \\ 1 & 0 \end{bmatrix}.$$

In still another possible design, in addition to mapping the modulation vector $A_i^l$ based on the matrix $B_i^l$ and mapping the modulation vector $A_j^l$ based on the matrix $B_j^l$, the transmitting device further maps a modulation vector $A_m^l$ based on a matrix $B_m^l$, where m is equal to neither i nor j, $B_m^l$ can be $$\begin{bmatrix} 1 & 0 \\ 0 & 1 \end{bmatrix} \text{ or } \begin{bmatrix} 0 & 1 \\ 1 & 0 \end{bmatrix},$$

N≥m≥1, and N≥3.

In still another possible design, the data processing method further includes: superposing, by the transmitting device, the modulation matrices $y_i^l$ that are respectively generated based on the L layers of modulation symbol sequences, to generate a to-be-sent matrix, where the to-be-sent matrix includes T element sequences in the first dimension, and the to-be-sent matrix includes i×U element sequences in a second dimension.

According to a third aspect, an embodiment of this application provides a transmitting device, where the transmitting device has a function of implementing steps in the method design of the first aspect or the second aspect. The function can be implemented by hardware, or can be implemented by hardware executing corresponding software. The hardware or the software includes one or more modules corresponding to the foregoing function. The module can be software and/or hardware.

According to a fourth aspect, an embodiment of this application provides a transmitting device. The transmitting device includes a modulation processor, a transmitter, a controller/processor, a memory, and an antenna. The modulation processor is configured to perform the data processing method according to the first aspect or the second aspect. The modulation processor processes a stream of bits to generate a modulation symbol sequence, and processes the generated modulation symbol sequence based on a matrix, so as to support the transmitting device in implementing the solutions in the method designs of the first aspect and the second aspect.

According to a fifth aspect, an embodiment of this application provides a computer storage medium, configured to store a computer software instruction used by the foregoing transmitting device. The computer storage medium includes a program for performing the foregoing aspects.

The transmitting device of the foregoing aspects can be a network side device, for example, a base station, or can be a terminal side device.

Compared with the prior art, in the solutions provided in this application, space diversity during resource mapping can be performed based on a symbol sequence. This brings a diversity gain, thereby improving communication reliability.

BRIEF DESCRIPTION OF DRAWINGS

The following describes in more details the embodiments of this application with reference to accompanying drawings.

DESCRIPTION OF EMBODIMENTS

Figure 1:
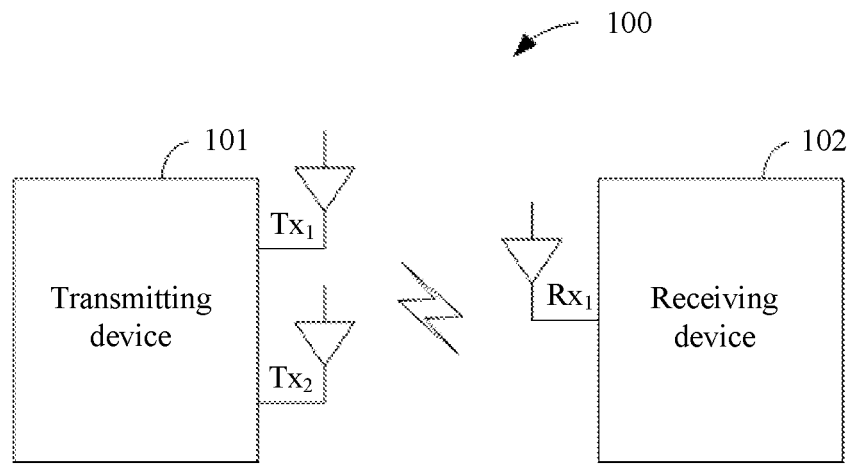
FIG. 1 is a schematic diagram of a possible communications network according to this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Terms such as "component", "module", and "system" used in this specification are used to indicate computer-related entities, hardware, firmware, combinations of hardware and software, software, or software being executed. For example, a component can be, but is not limited to, a process that runs on a processor, a processor, an object, an executable file, an execution thread, a program, and/or a computer. As shown in figures, both a computing device and an application that runs on a computing device can be components. One or more components may reside within a process and/or an execution thread, and a component can be located on one computer and/or distributed between two or more computers. In addition, these components can be executed from various computer-readable media that store various data structures. For example, the components may perform communication by using a local and/or remote process and based on, for example, a signal having one or more data packets (for example, data from two components interacting with another component in a local system, a distributed system, and/or across a network such as the Internet interacting with other systems by using the signal).

The embodiments are described in this application with reference to a terminal. The terminal may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal can be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

In addition, the embodiments are described in this application with reference to a network device. The network device can be a device used by a network side to communicate with a mobile device, and the network side device can be a base transceiver station (BTS) in global system for mobile communication (GSM) or code division multiple access (CDMA), or can be an NodeB (NB) in wideband code division multiple access (WCDMA), or can be an eNB or evolved Node B (eNodeB) in long term evolution (LTE), a relay station or an access point, an in-vehicle device, a wearable device, a network side device in a future 5G network, or the like. In this specification, an example in which the network device is a base station is used for description.

In addition, aspects or features of this application can be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disk (CD), a digital versatile disk (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain and/or carry an instruction and/or data.

FIG. 1 is a schematic diagram of a communications system that uses a data processing method of this application. As shown in FIG. 1, the wireless communications system 100 includes at least a transmitting device 101 and a receiving device 102. The transmitting device 101 includes at least two antennas. For example, the transmitting device 101 includes transmitting antennas $Tx_1$ and $Tx_2$. The receiving device 102 includes at least one antenna. For example, the receiving device 102 includes a receiving antenna $Rx_1$. Although a limited quantity of antennas are shown for the transmitting device 101 and the receiving device 102 in FIG. 1, both the transmitting device 101 and the receiving device 102 may use more antennas. A transmitting device that uses a plurality of antennas also has receiving capabilities of the plurality of antennas; and a receiving device that uses a plurality of antennas also has sending capabilities of the plurality of antennas. The foregoing antenna can be a physical antenna or a logical port (which can be referred to as an antenna port) corresponding to a reference signal.

The transmitting device 101 can be a network side device or a terminal device. When the transmitting device 101 is a network side device, the receiving device 102 is a terminal device; or when the transmitting device 101 is a terminal device, the receiving device 102 is a network side device.

Figure 2:
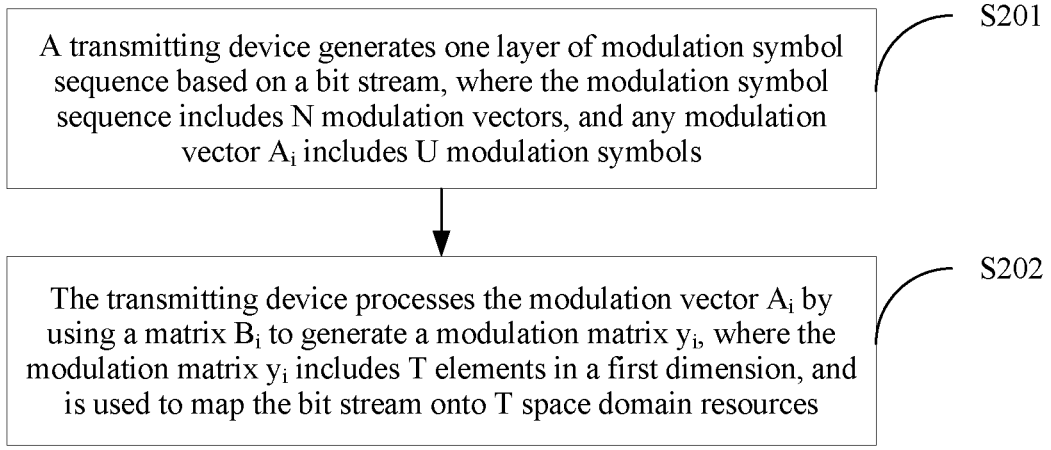
FIG. 2 is a schematic flowchart of a data processing method according to an embodiment of this application.

FIG. 2 is a schematic flowchart of a data processing method 200 according to an embodiment of this application. The data processing method 200 is mainly applied to a transmitting device. The transmitting device can be a network device (for example, one of the foregoing network devices). In other words, the method 200 can be applied to downlink transmission. Alternatively, the transmitting device can be a terminal device (for example, one of the foregoing user equipment). In other words, the method 200 can be applied to uplink transmission. As shown in FIG. 2, the data processing method 200 includes the following steps.

S201. A transmitting device generates one layer of modulation symbol sequence based on a stream of bits, where the modulation symbol sequence includes N modulation vectors, any modulation vector $A_i$ includes U modulation symbols, $U \geq 2$, $N \geq i \geq 1$, and N is a positive integer.

S202. The transmitting device processes the modulation vector $A_i$ by using a matrix $B_i$ to generate a modulation matrix $y_i$, where the modulation matrix $y_i$ includes T elements in a first dimension, T is a quantity of space domain resources used to transmit the stream of bits, $T \geq 2$, and the modulation matrix $y_i$ is used to map the stream of bits onto the T space domain resources. For example, the space domain resource can be an antenna or an antenna port. The following uses "antenna port" as an example for description.

According to the data processing method provided in this embodiment, the transmitting device maps the one layer of modulation symbol sequence onto T antenna ports and sends the one layer of modulation symbol that is mapped, so that a space diversity gain can be generated in code domain, and a bit error rate is reduced, thereby improving communication reliability.

On a receiving device side, the receiving device receives a signal that is from the transmitting device and that is obtained through mapping based on the modulation matrix $y_i$, and completes corresponding decoding according to a modulation and coding scheme and a mapping manner at each layer.

The following uses an example in which a terminal is used as the transmitting device (that is, an execution body of the method 200 in this embodiment of this application) to describe a procedure of the foregoing method 200 in detail.

First, step S201 is further described. In step S201, the transmitting device may process the stream of bits in a multiple access manner to generate the modulation symbol sequence. The multiple access manner can be one of the following orthogonal or non-orthogonal multiple access technologies: a sparse code division multiple access SCMA manner, an orthogonal frequency division multiplexing OFDM technology, a frequency division multiple access (FDMA) manner, a time division multiple access (TDMA) manner, a code division multiple access (CDMA) manner, a pattern division multiple access (PDMA) manner, a non-orthogonal multiple access (NOMA) manner, a multi-user shared access (MUSA) manner, or the like, so that a communications system used in this embodiment of this application can support a plurality of users. In the following, the SCMA is used as an example for description. In a system that uses the SCMA, the transmitting device maps the stream of bits onto SCMA code words by using multi-dimensional modulation and sparse spread spectrum, and the receiving device completes decoding based on multiuser detection.

Figure 3:
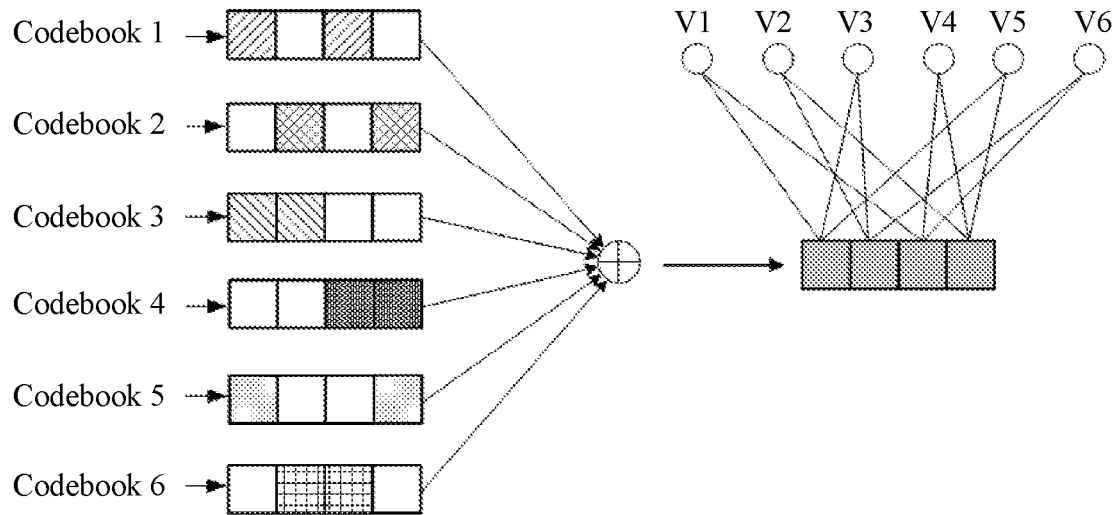
FIG. 3 is a schematic diagram of codebook mapping according to an embodiment of this application.

In the following, an SCMA codebook is first described as an example. FIG. 3 is a simplified schematic diagram of SCMA codebook mapping. The SCMA codebook includes a zero symbol (a blank part) and a non-zero symbol (a shaded part), and each SCMA codebook is distinguished by using a position of the non-zero symbol. For ease of description, a factor graph can be used to represent a correspondence between the codebook and a resource element (RE). Variable nodes (VN) are corresponding to the transmitting devices that use different SCMA codebooks, and are respectively represented by V1 to V6. Function nodes (FN) are corresponding to different REs. When the VN is connected to the FN, it indicates that the transmitting device sends a non-zero modulation symbol on a corresponding RE; or when the VN is not connected to the FN, it indicates that the transmitting device sends a zero modulation symbol on the corresponding RE. The foregoing uses six transmitting devices as an example to describe how to carry data of the six transmitting devices on four resource elements.

One transmitting device may process the stream of bits by using a same SCMA codebook to generate the one layer of modulation symbol sequence, or may process the stream of bits by using different SCMA codebooks to generate the one layer of modulation symbol sequence. Optionally, the modulation vector $A_i$ may include U modulation symbols, and the U modulation symbols may include at least one non-zero modulation symbol and at least one zero modulation symbol. For example, based on the different SCMA codebooks that are used, a length of the modulation vector $A_i$ in the modulation symbol sequence is 4, that is, U=4. Referring to FIG. 3, a modulation vector $A_i$ that uses a codebook 1 can be represented in a form of $[x_1,0,x_3,0]$; a modulation vector $A_i$ that uses a codebook 2 can be represented in a form of $[0,x_2,0,x_4]$; a modulation vector $A_i$ that uses a codebook 3 can be represented in a form of $[x_1,x_2,0,0]$; a modulation vector $A_i$ that uses a codebook 4 can be represented in a form of $[0,0,x_3,x_4]$; a modulation vector $A_i$ that uses a codebook 5 can be represented in a form of $[x_1,0,0,x_4]$; and a modulation vector $A_i$ that uses a codebook 6 can be represented in a form of $[0,x_2,x_3,0]$. It should be noted that, $x_1$, $x_2$, $x_3$, and $x_4$ in this application are used to indicate that corresponding positions are non-zero modulation symbols, and are not used to limit values of the non-zero modulation symbols. In another implementation, the U modulation symbols in the modulation vector $A_i$ are non-zero modulation symbols.

When using the same SCMA codebook, the transmitting device sequentially processes, by using the SCMA codebook, a unit quantity (for example, two bits or four bits) of bits in the stream of bits to generate the one layer of modulation symbol sequence. The one layer of modulation symbol sequence includes N modulation vectors, and each modulation vector is corresponding to a unit quantity of bits. Because the unit quantity of bits use the same SCMA codebook, positions of non-zero elements in generated modulation vectors are the same, that is, forms are the same. For example, the modulation vectors $A_i$ can be represented in the form of $[x_1,0,x_3,0]$, or can be represented in the form of $[0,x_2,0,x_4]$, and this is not limited in this application.

When using different SCMA codebooks, the transmitting device sequentially processes, by using the different SCMA codebooks, a unit quantity of bits in the stream of bits to generate the one layer of modulation symbol sequence. The plurality of SCMA codebooks can be used in a cyclically manner, or can be used in a random manner. The one layer of modulation symbol sequence includes N modulation vectors, and each modulation vector is corresponding to a unit quantity of bits. Because the unit quantity of bits use different SCMA codebooks, the positions of the non-zero modulation symbols in generated modulation vectors are different, that is, the forms are different. For example, a modulation vector $A_i$ can be represented in the form of $[x_1,0,x_3,0]$, and a modulation vector $A_2$ can be represented in the form of $[0,x_2,0,x_4]$. This is not limited in this application.

In step S220, the transmitting device processes the modulation vector $A_i$ by using the matrix $B_i$ to generate the modulation matrix $y_i$, where the modulation matrix $y_i$ includes T elements in the first dimension. T is a quantity of antenna ports used to transmit the stream of bits, and the modulation matrix $y_i$ is used to map the stream of bits onto the T antenna ports.

Specifically, the transmitting device performs mapping by using the matrix $B_i$ to generate the modulation matrix $y_i$, where the modulation matrix $y_i$ includes T elements in the first dimension. In other words, the modulation matrix $y_i$ includes T element sequences in the first dimension. Each element sequence is corresponding to an antenna port, so that the modulation matrix $y_i$ is mapped onto the T antenna ports. In this way, by performing mapping by using the matrix $B_i$, the space diversity gain in code domain can be obtained based on the modulation vector $A_i$, and the bit error rate is reduced.

In the following, the matrix $B_i$ is described. Dimensions of the matrix $B_i$ include a row and a column. The first dimension can be a row of the matrix $B_i$, and the second dimension is a column of the matrix. Alternatively, the first dimension can be a column of the matrix, and the second dimension can be a row of the matrix. This is not specifically limited. In this embodiment of this application, the first dimension is a row of the matrix $B_i$, and the second dimension is a column of the matrix $B_i$.

A quantity of elements that are included in at least one dimension (which is the first dimension in this implementation) of each matrix $B_i$ is T, so that at least one dimension of the modulation matrix $y_i$ obtained after mapping includes T element sequences. Optionally, at least one of the T element sequences is a non-zero element sequence, and the non-zero element sequence is an element sequence that includes at least one non-zero element.

In the second dimension, the matrix $B_i$ may include element sequences whose quantity is different from the quantity of the modulation symbols in the modulation vector $A_i$ (case 1). Alternatively, in the second dimension, the matrix $B_i$ may include element sequences whose quantity is the same as the quantity of the modulation symbols in the modulation vector $A_i$ (case 2). The following describes the two cases separately.

Case 1:

The matrix $B_i$ includes V element sequences in the second dimension, and the V element sequences are non-zero element sequences. All the non-zero element sequences are corresponding to all non-zero modulation symbols in the modulation vector $A_i$.

For example, the modulation vector $A_i$ is represented in the form of $[x_1, 0, x_3, 0]$, and T=2 (that is, two antenna ports). The matrix $B_i$ can be $$\begin{bmatrix} 1 & 0 \\ 0 & 1 \end{bmatrix},$$

and in this case, all the modulation vectors use the same $B_i$. It can be learned that, the matrix $B_i$ is a diagonal matrix; and the matrix $B_i$ includes two element sequences (that is, T=2) in the row, which are corresponding to the two antenna ports. The matrix $B_i$ includes two element sequences in the column, where the two element sequences are non-zero element sequences and are corresponding to two non-zero modulation symbols in the modulation vector $A_i$. Through the foregoing process, $[x_1, 0, x_3, 0]$ is mapped onto element sequences corresponding to two antenna ports.

Next, a mapping process is further described by using $[x_1, 0, x_3, 0]$ as an example. In the following mapping process, a formula Q=map (R, C) is used, where R is a row vector, Q and C are matrices, and a quantity of columns of R is equal to a quantity of rows of C. The mapping operation is specifically as follows: Each column of Q is obtained by point multiplying each column vector of a transposed R by each column vector of C.

First, the transmitting device selects non-zero modulation symbols $[x_1, x_3]$ from $[x_1, 0, x_3, 0]$, and generates the following matrix based on a matrix $$B_i = \begin{bmatrix} 1 & 0 \\ 0 & 1 \end{bmatrix};$$

$$A'_i = \begin{bmatrix} x_1 & 0 \\ 0 & x_3 \end{bmatrix} = \mathrm{map}\left([x_1, x_3], \begin{bmatrix} 1 & 0 \\ 0 & 1 \end{bmatrix}\right);$$

that is, a first column and a second column of $A'_i$ are respectively obtained by point multiplying a transposed row vector $[x_1, x_3]$ by a first column $$\begin{bmatrix} 1 \\ 0 \end{bmatrix}$$

of $B_i$ and by point multiplying the transposed row vector $[x_1, x_3]$ by a second column $$\begin{bmatrix} 0 \\ 1 \end{bmatrix}$$

of $B_i$, and the following mapping operations are similar to this. Zeros are added to the matrix $A'_i$ based on positions of zero modulation symbols in $[x_1, 0, x_3, 0]$ to generate a modulation matrix:

$$y_i = \begin{bmatrix} x_1 & 0 \\ 0 & 0 \\ 0 & x_3 \\ 0 & 0 \end{bmatrix}.$$

Figure 4:
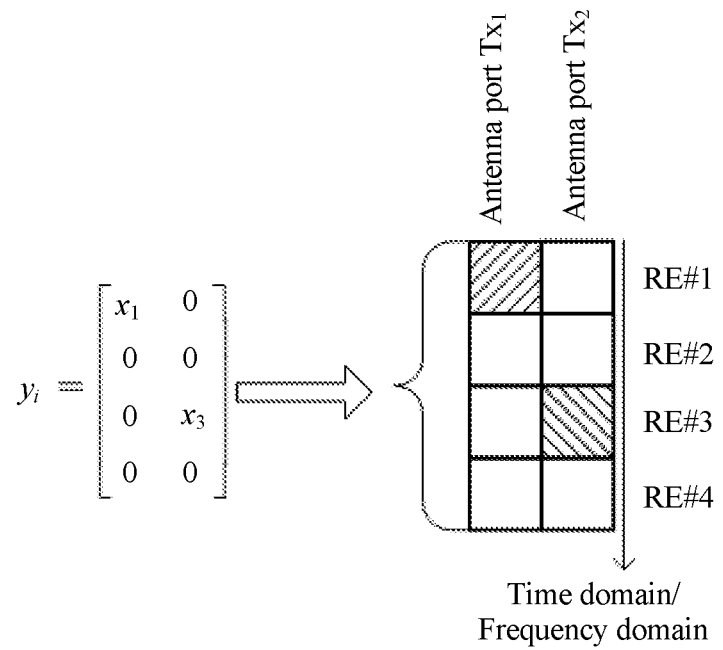
FIG. 4 is a schematic diagram of modulation matrix mapping according to an embodiment of this application.

The modulation matrix $y_i$ includes two columns of elements, and the transmitting device maps the two columns of elements onto the two antenna ports. FIG. 4 is a schematic diagram of resource mapping of the modulation matrix $y_i$. Elements of the first column in the $y_i$ are mapped onto resource elements RE #1 to RE #4 that are corresponding to $Tx_1$, and elements of the second column are mapped onto resource elements RE #1 to RE #4 that are corresponding to $Tx_2$. In another implementation, the elements of the first column in $y_i$ can be alternatively mapped onto $Tx_2$, and the elements of the second column can be alternatively mapped onto $Tx_1$.

Optionally, the matrix $B_i$ can alternatively be $$\begin{bmatrix} 0 & 1 \\ 1 & 0 \end{bmatrix}.$$

First, the transmitting device selects the non-zero modulation symbols $[x_1, x_3]$ from $[x_1, 0, x_3, 0]$, and generates the following matrix based on the matrix $B_i$:

$$A'_i = \begin{bmatrix} 0 & x_1 \\ x_3 & 0 \end{bmatrix} = \mathrm{map}\left([x_1, x_3], \begin{bmatrix} 0 & 1 \\ 1 & 0 \end{bmatrix}\right);$$

zeroes are added to the matrix $A'_i$ based on the positions of the zero modulation symbols in $[x_1,0,x_3,0]$ to generate a modulation matrix:

$$y_i = \begin{bmatrix} 0 & x_1 \\ 0 & 0 \\ x_3 & 0 \\ 0 & 0 \end{bmatrix}.$$

Figure 5:
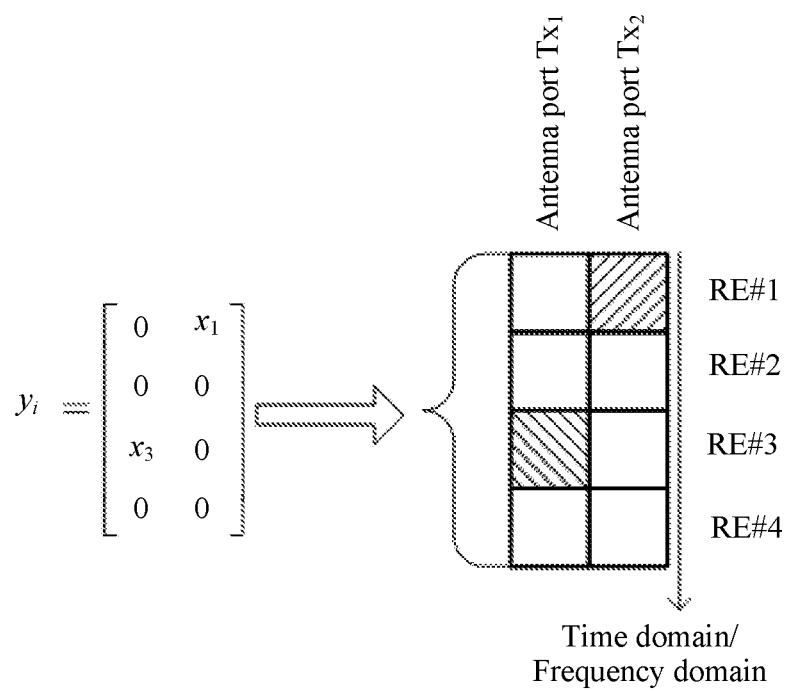
FIG. 5 is another schematic diagram of modulation matrix mapping according to an embodiment of this application.

The modulation matrix $y_i$ includes two columns of elements, and the transmitting device maps the two columns of elements onto the two antenna ports. FIG. 5 is a schematic diagram of resource mapping of the modulation matrix $y_i$.

In some other implementations, the transmitting device may alternatively process the one layer of modulation symbol sequence by circulating two matrices $B_i$ and $B_j$. Forms of the processed modulation vectors can be the same or can be different, and this is not limited herein. Specifically, the transmitting device processes the modulation vector $A_i$ based on the matrix $B_i$, and processes the modulation vector $A_j$ based on the matrix $B_j$, where the $B_i$ and the $B_j$ are different, i is not equal to j, N≥j≥1, and N≥2. In the following, two modulation vectors $A_i$ and $A_j$ at the one layer of modulation symbol sequence that is generated by using the same codebook are used as an example for description, a position relationship between the two modulation vectors $A_i$ and $A_j$ can be adjacent or non-adjacent. Forms of the two modulation vectors $A_i$ and $A_j$ can be the same or can be different. In the following, adjacent modulation vectors $A_i$ and $A_j$ that are in a same form are used as an example for description.

Specifically, the transmitting device maps the modulation vector $A_i$ by using the matrix $B_i$, and maps the modulation vector $A_j$ by using the matrix $B_j$, where the two modulation vectors $A_i$ and $A_j$ are represented in the form of $[x_1,0,x_3,0]$.

For the modulation vector $A_i$, the transmitting device selects the non-zero modulation symbols $[x_1,x_3]$ from $[x_1,0,x_3,0]$, and generates the following matrix based on a matrix $$B_i = \begin{bmatrix} 1 & 0 \\ 1 & 0 \end{bmatrix};$$

$$A'_i = \begin{bmatrix} x_1 & 0 \\ x_3 & 0 \end{bmatrix} = \mathrm{map}\left([x_1, x_3], \begin{bmatrix} 1 & 0 \\ 1 & 0 \end{bmatrix}\right);$$

and the transmitting device adds zeros to the matrix $A'_i$ based on the positions of the zero modulation symbols in $[x_1,0,x_3,0]$ to generate a modulation matrix:

$$y_i = \begin{bmatrix} x_1 & 0 \\ 0 & 0 \\ x_3 & 0 \\ 0 & 0 \end{bmatrix}.$$

The modulation matrix $y_i$ includes two columns of elements, and the two columns of elements are mapped onto the two antenna ports. Elements of a first column in the $y_i$ are mapped onto resource elements RE #1 to RE #4 corresponding to $Tx_1$, and elements of a second column are mapped onto resource elements RE #1 to RE #4 corresponding to $Tx_2$.

For the modulation vector $A_j$, the transmitting device selects non-zero modulation symbols $[x_1,x_3]$ from the modulation vector $A_j$, and generates the following matrix based on a matrix $$B_j = \begin{bmatrix} 0 & 1 \\ 0 & 1 \end{bmatrix};$$

$$A'_j = \begin{bmatrix} 0 & x_1 \\ 0 & x_3 \end{bmatrix} = \mathrm{map}\left([x_1, x_3], \begin{bmatrix} 0 & 1 \\ 0 & 1 \end{bmatrix}\right);$$

and the transmitting device adds zeroes to the matrix $A'_j$ based on the positions of the zero modulation symbols in $[x_1,0, x_3,0]$ to generate the following modulation matrix:

$$y_j = \begin{bmatrix} 0 & x_1 \\ 0 & 0 \\ 0 & x_3 \\ 0 & 0 \end{bmatrix}.$$

The modulation matrix $y_j$ includes two columns of elements, and the two columns of elements are mapped onto the two antenna ports. Elements of a first column in the $y_j$ are mapped onto resource elements RE #5 to RE #8 corresponding to $Tx_1$, and elements of a second column are mapped onto resource elements RE #5 to RE #8 corresponding to $Tx_2$.

Figure 6:
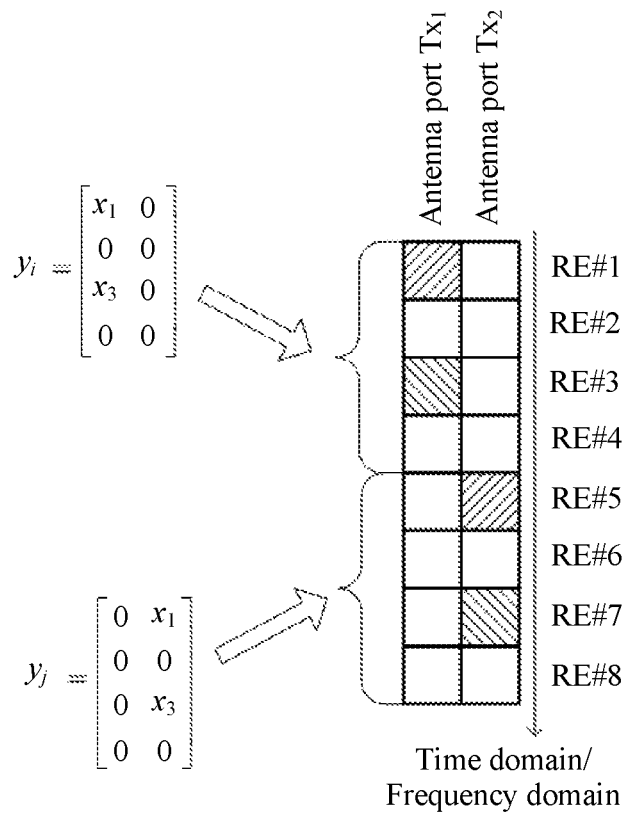
FIG. 6 is still another schematic diagram of modulation matrix mapping according to an embodiment of this application.

FIG. 6 is a schematic diagram of resource mapping of the modulation matrices $y_i$ and $y_j$ in this implementation.

In another implementation, based on the foregoing manner of circulating the matrices $B_i$ and $B_j$, the transmitting device may alternatively map a modulation vector $A_m$ based on another matrix $B_m$, where m is equal to neither i nor j, N≥m≥1, and N≥3. $B_m$ is $$\begin{bmatrix} 1 & 0 \\ 0 & 1 \end{bmatrix}$$

or $B_m$ is $$\begin{bmatrix} 0 & 1 \\ 1 & 0 \end{bmatrix}.$$

The transmitting device can map each modulation vector in the modulation symbol sequence by circulating three matrices $B_i$, $B_j$, and $B_m$. For example, the transmitting device maps the modulation vector $A_i$ by using the matrix $B_i$, maps the modulation vector $A_j$ by using the matrix $B_j$, and maps the modulation vector $A_m$ by using the $B_m$. After completing a cycle, the transmitting device continues to process a modulation vector following the modulation vector $A_m$ by using the matrix $B_i$. In another implementation, the transmitting device may alternatively process the one layer of modulation symbol sequence by using the foregoing four or more matrices.

Case 2:

The matrix $B_i$ includes U element sequences in a second dimension, where the U element sequences are corresponding to the U modulation symbols in the modulation vector $A_i$. The U element sequences include V non-zero element sequences, and positions of the V non-zero element sequences in the U element sequences are the same as positions of the V non-zero modulation symbols in the U modulation symbols.

$[x_1, 0, x_3, 0]$ and the two antenna ports (T=2) are used as an example. The matrix $B_i$ can be $$\begin{bmatrix} 1 & 0 \\ 0 & 0 \\ 0 & 1 \\ 0 & 0 \end{bmatrix}.$$

The matrix $B_i$ includes two element sequences in a first dimension (in this implementation, the first dimension is a row), which are corresponding to the two antenna ports; and the matrix $B_i$ includes four element sequences in the second dimension (in this implementation, the second dimension is a column), where a first row and a third row are two non-zero element sequences, which are corresponding to two non-zero modulation symbols.

The matrix $B_i$ is further described in the following. The matrix $B_i$ is obtained, based on positions of zero elements in $[x_1, 0, x_3, 0]$, by adding zeros to a diagonal matrix $$\begin{bmatrix} 1 & 0 \\ 0 & 1 \end{bmatrix},$$

so that non-zero modulation symbols in $[x_1, 0, x_3, 0]$ can be mapped onto different antenna ports. Optionally, the matrix $B_i$ can be alternatively obtained based on an inverse diagonal matrix $$\begin{bmatrix} 0 & 1 \\ 1 & 0 \end{bmatrix}$$

or a combination of $$\begin{bmatrix} 1 & 0 \\ 1 & 0 \end{bmatrix} \text{ and } \begin{bmatrix} 0 & 1 \\ 0 & 1 \end{bmatrix}.$$

Table 1 lists example matrices that can be used by modulation vectors in different forms.

TABLE 1

| | Option 1 (Option 1) | Option 2 (Option 2) | Option 3 (Option 3) | Option 4 (Option 4) |
|---|---|---|---|---|
| $[x_1, 0, x_3, 0]$ | $\begin{bmatrix} 1 & 0 \\ 0 & 0 \\ 0 & 1 \\ 0 & 0 \end{bmatrix}$ | $\begin{bmatrix} 0 & 1 \\ 0 & 0 \\ 1 & 0 \\ 0 & 0 \end{bmatrix}$ | A combination of $\begin{bmatrix} 1 & 0 \\ 0 & 0 \\ 1 & 0 \\ 0 & 0 \end{bmatrix}$ and $\begin{bmatrix} 0 & 1 \\ 0 & 0 \\ 0 & 1 \\ 0 & 0 \end{bmatrix}$ | A combination of options 1 and 3, or a combination of options 2 and 3, or a combination of options 1, 2, and 3 |
| $[0, x_2, 0, x_4]$ | $\begin{bmatrix} 0 & 0 \\ 1 & 0 \\ 0 & 0 \\ 0 & 1 \end{bmatrix}$ | $\begin{bmatrix} 0 & 0 \\ 0 & 1 \\ 0 & 0 \\ 1 & 0 \end{bmatrix}$ | A combination of $\begin{bmatrix} 0 & 0 \\ 1 & 0 \\ 0 & 0 \\ 1 & 0 \end{bmatrix}$ and $\begin{bmatrix} 0 & 0 \\ 0 & 1 \\ 0 & 0 \\ 0 & 1 \end{bmatrix}$ | A combination of options 1 and 3, or a combination of options 2 and 3, or a combination of options 1, 2, and 3 |
| $[x_1, x_2, 0, 0]$ | $\begin{bmatrix} 1 & 0 \\ 0 & 1 \\ 0 & 0 \\ 0 & 0 \end{bmatrix}$ | $\begin{bmatrix} 0 & 1 \\ 1 & 0 \\ 0 & 0 \\ 0 & 0 \end{bmatrix}$ | A combination of $\begin{bmatrix} 1 & 0 \\ 1 & 0 \\ 0 & 0 \\ 0 & 0 \end{bmatrix}$ and $\begin{bmatrix} 0 & 1 \\ 0 & 1 \\ 0 & 0 \\ 0 & 0 \end{bmatrix}$ | A combination of options 1 and 3, or a combination of options 2 and 3, or a combination of options 1, 2, and 3 |
| $[0, 0, x_3, x_4]$ | $\begin{bmatrix} 0 & 0 \\ 0 & 0 \\ 1 & 0 \\ 0 & 1 \end{bmatrix}$ | $\begin{bmatrix} 0 & 0 \\ 0 & 0 \\ 0 & 1 \\ 1 & 0 \end{bmatrix}$ | A combination of $\begin{bmatrix} 0 & 0 \\ 0 & 0 \\ 1 & 0 \\ 1 & 0 \end{bmatrix}$ and $\begin{bmatrix} 0 & 0 \\ 0 & 0 \\ 0 & 1 \\ 0 & 1 \end{bmatrix}$ | A combination of options 1 and 3, or a combination of options 2 and 3, or a combination of options 1, 2, and 3 |
| $[x_1, 0, 0, x_4]$ | $\begin{bmatrix} 1 & 0 \\ 0 & 0 \\ 0 & 0 \\ 0 & 1 \end{bmatrix}$ | $\begin{bmatrix} 0 & 1 \\ 0 & 0 \\ 0 & 0 \\ 1 & 0 \end{bmatrix}$ | A combination of $\begin{bmatrix} 1 & 0 \\ 0 & 0 \\ 0 & 0 \\ 1 & 0 \end{bmatrix}$ and $\begin{bmatrix} 0 & 1 \\ 0 & 0 \\ 0 & 0 \\ 0 & 1 \end{bmatrix}$ | A combination of options 1 and 3, or a combination of options 2 and 3, or a combination of options 1, 2, and 3 |

TABLE 1-continued

| | Option 1 (Option 1) | Option 2 (Option 2) | Option 3 (Option 3) | Option 4 (Option 4) |
|---|---|---|---|---|
| $[0, x_2, x_3, 0]$ | $\begin{bmatrix} 0 & 0 \\ 1 & 0 \\ 0 & 1 \\ 0 & 0 \end{bmatrix}$ | $\begin{bmatrix} 0 & 0 \\ 0 & 1 \\ 1 & 0 \\ 0 & 0 \end{bmatrix}$ | A combination of $\begin{bmatrix} 0 & 0 \\ 0 & 1 \\ 0 & 1 \\ 0 & 0 \end{bmatrix}$ and $\begin{bmatrix} 0 & 0 \\ 1 & 0 \\ 1 & 0 \\ 0 & 0 \end{bmatrix}$ | A combination of options 1 and 3, or a combination of options 2 and 3, or a combination of options 1, 2, and 3 |

For example, the modulation vector $A_i$ is represented in the form of $[x_1,0,x_3,0]$. When the matrix $B_i$ uses the option 1, the transmitting device generates a modulation matrix based on the matrix $B_i$:

$$y_i = \begin{bmatrix} x_1 & 0 \\ 0 & 0 \\ 0 & x_3 \\ 0 & 0 \end{bmatrix} = map\left([x_1, 0, x_3, 0], \begin{bmatrix} 1 & 0 \\ 0 & 0 \\ 0 & 1 \\ 0 & 0 \end{bmatrix}\right).$$

The transmitting device maps two columns of elements of the modulation matrix $y_i$ onto the two antenna ports.

When the matrix $B_i$ uses the option 2, the transmitting device generates a modulation matrix based on the matrix $B_i$:

$$y_i = \begin{bmatrix} 0 & x_1 \\ 0 & 0 \\ x_3 & 0 \\ 0 & 0 \end{bmatrix} = map\left([x_1, 0, x_3, 0], \begin{bmatrix} 0 & 1 \\ 0 & 0 \\ 1 & 0 \\ 0 & 0 \end{bmatrix}\right).$$

The transmitting device maps two columns of elements of the modulation matrix $y_i$ onto the two antenna ports.

When the option 3 is used, the transmitting device maps two adjacent or non-adjacent modulation vectors $A_i$ and $A_j$ in the modulation symbol sequence in a circulating manner.

In the following, two adjacent modulation vectors that are represented in a form of $[x_1,0,x_3,0]$ are used as an example for further description.

The transmitting device processes the modulation vector $A_i$ by using the matrix $B_i$ to generate a modulation matrix:

$$y_i = \begin{bmatrix} x_1 & 0 \\ 0 & 0 \\ x_3 & 0 \\ 0 & 0 \end{bmatrix} = map\left([x_1, 0, x_3, 0], \begin{bmatrix} 1 & 0 \\ 0 & 0 \\ 1 & 0 \\ 0 & 0 \end{bmatrix}\right).$$

The transmitting device maps two columns of elements of the modulation matrix $y_i$ onto the two antenna ports.

The transmitting device maps the modulation vector $A_j$ based on the matrix $B_j$ to generate a modulation matrix:

$$y_j = \begin{bmatrix} 0 & x_1 \\ 0 & 0 \\ 0 & x_3 \\ 0 & 0 \end{bmatrix} = map\left([x_1, 0, x_3, 0], \begin{bmatrix} 0 & 1 \\ 0 & 0 \\ 0 & 1 \\ 0 & 0 \end{bmatrix}\right).$$

The transmitting device maps two columns of elements of the modulation matrix $y_j$ onto the two antenna ports.

Another embodiment of this application is further described below with reference to FIG. 5.

Figure 7:
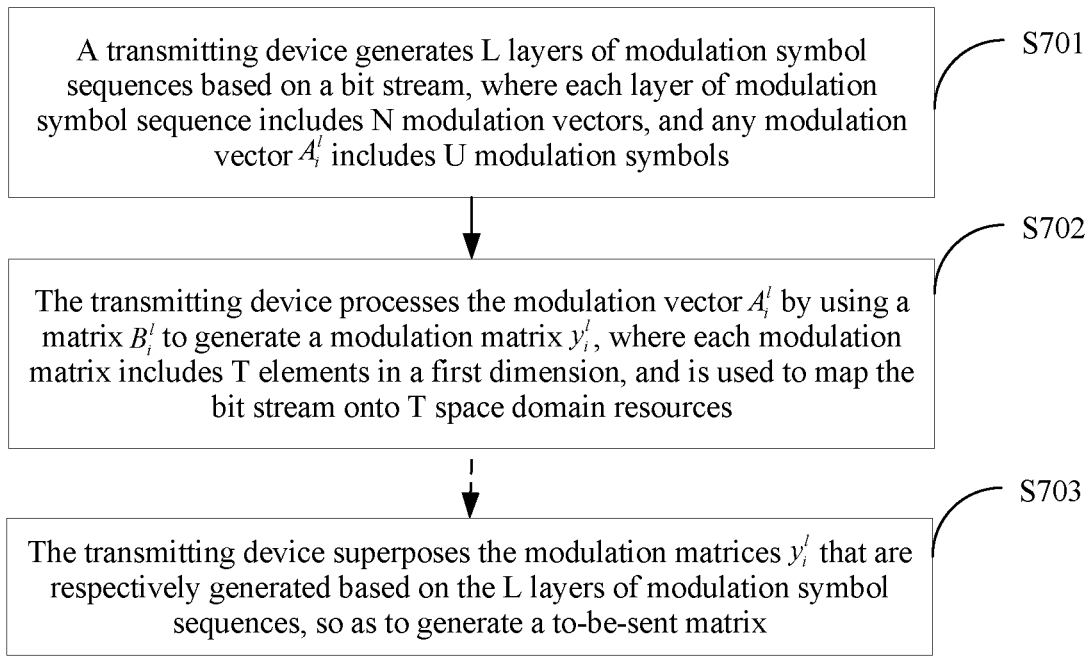
FIG. 7 is a schematic flowchart of another data processing method according to an embodiment of this application.

FIG. 7 is another data processing method according to an embodiment of this application. A difference from the data processing method 200 shown in FIG. 2 lies in that, according to the data processing method, a plurality of layers of modulation symbol sequences can be generated and processed based on a stream of bits.

Step S701: A transmitting device generates L layers of modulation symbol sequences based on a stream of bits, where each layer of modulation symbol sequence includes N modulation vectors, any modulation vector $A_i^l$ includes U modulation symbols, L is a positive integer and L≥2, N is a positive integer and N≥i≥1, U≥2, and l=1 . . . L.

In an example, the transmitting device separately generates the L layers of modulation symbol sequences by using L codebooks, for example, generates six layers of modulation symbol sequences by using the six codebooks shown in FIG. 3. In another example, the transmitting device may separately generate L layers of modulation symbol sequences by using L codebook combinations, where the L codebook combinations include different codebooks. For each layer of modulation symbol sequence, for details about the modulation vector $A_i^l$, refer to the description of the modulation vector $A_i$ in step S201 shown in FIG. 2. Details are not described herein again.

Step S702: The transmitting device processes $A_i^l$ by using a matrix $B_i^l$ to generate a modulation matrix $y_i^l$, where each modulation matrix includes T elements in a first dimension, T is a quantity of space domain resources, T≥2, and the modulation matrix $y_i^l$ is used to map the stream of bits onto the T space domain resources.

According to the data processing method, the transmitting device may generate the plurality of layers of modulation symbol sequences based on the stream of bits, and process the plurality of layers of modulation symbol sequences to provide a space diversity gain.

In an example, the U modulation symbols include at least one non-zero modulation symbol and at least one zero modulation symbol. More specifically, the modulation vector $A_i^l$ includes V non-zero modulation symbols, where U≥V≥1. The matrix $B_i^l$ includes T element sequences in the first dimension, where at least one of the T element sequences is a non-zero element sequence, and the non-zero element sequence includes at least one non-zero element. The matrix $B_i^l$ includes V non-zero element sequences in a second dimension.

When the first dimension is a row and the transmitting device has two antenna ports (that is, T=2), the transmitting device maps the modulation vector $A_i^l$ based on the matrix $B_i^l$, where $B_i^l$ is $$\begin{bmatrix} 1 & 0 \\ 0 & 1 \end{bmatrix}$$

or $B_i^l$ is $$\begin{bmatrix} 0 & 1 \\ 1 & 0 \end{bmatrix}.$$

In another example, the transmitting device maps the modulation vector $A_i^l$ based on the matrix $B_i^l$, maps $A_j^l$ based on a matrix $B_j^l$, i is not equal to j, $N \geq j \geq 1$, and $N \geq 2$, where $B_i^l$ is $$\begin{bmatrix} 0 & 1 \\ 0 & 1 \end{bmatrix},$$

and $B_j^l$ is $$\begin{bmatrix} 1 & 0 \\ 1 & 0 \end{bmatrix}.$$

In still another example, in addition to mapping the modulation vector $A_i^l$ based on the matrix $B_i^l$ and mapping the modulation vector $A_j^l$ based on the matrix $B_j^l$, the transmitting device further maps a modulation vector $A_m^l$ based on a matrix $B_m^l$, where m is equal to neither i nor j, $B_m^l$ can be $$\begin{bmatrix} 1 & 0 \\ 0 & 1 \end{bmatrix}$$

or $B_m^l$ can be $$\begin{bmatrix} 0 & 1 \\ 1 & 0 \end{bmatrix},$$

$N \geq m \geq 1$, and $N \geq 3$.

For more detailed implementation of step 702, refer to the related description of step 202 shown in FIG. 2. Details are not described herein again.

Figure 8:
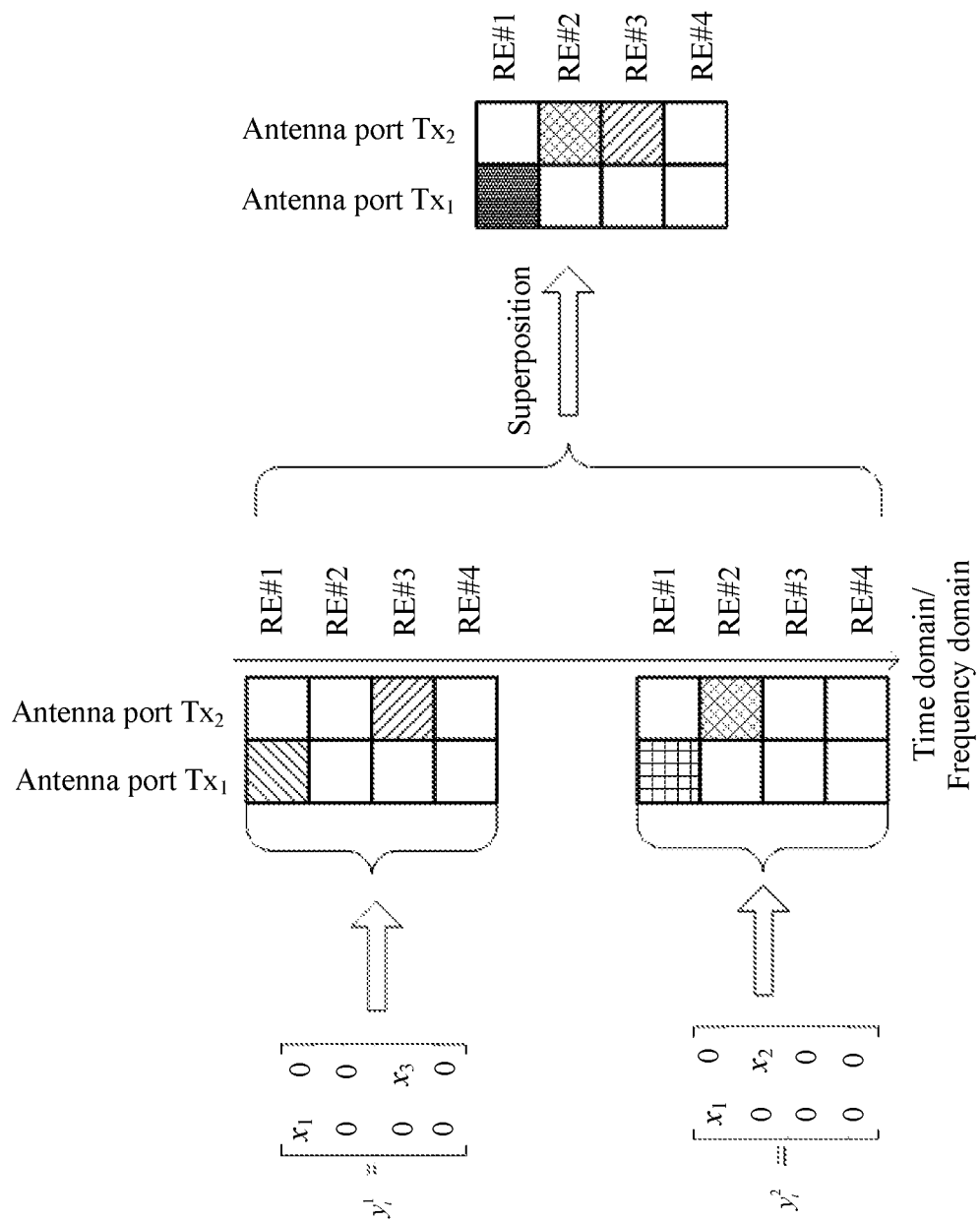
FIG. 8 is a schematic diagram of modulation matrix mapping and superposition according to an embodiment of this application.

Optionally, the data processing method further includes step 703: The transmitting device superposes the modulation matrices $y_i^l$ that are respectively generated based on the L layers of modulation symbol sequences, to generate a to-be-sent matrix. The to-be-sent matrix includes T element sequences in the first dimension, and the to-be-sent matrix includes i×U element sequences in a second dimension. FIG. 8 is a schematic diagram of superposing the modulation matrices $y_i^1$ and $y_i^2$ that are respectively generated based on two layers of modulation symbol sequences.

It should be noted that, the data processing method for generating one layer of modulation symbol sequence is commonly performed by a terminal. In other words, the data processing method is applied to uplink transmission. In some cases, if the system 100 includes a plurality of terminals, when the plurality of terminals send data or signals to a same network side device, the signals can be superposed during propagation. The data processing method for generating a plurality of layers of modulation symbol sequences are commonly performed by the network side device. In other words, the data processing method is applied to downlink transmission. It can be understood that, the foregoing description is merely used as an example, and is not used as a limitation on this application.

The foregoing mainly describes the solutions provided in this embodiment of this application from a perspective of a transmitting device, where the transmitting device can be user equipment such as the terminal, or can be the network side device such as a base station. It can be understood that, to implement the foregoing functions, each network element such as the terminal or the base station includes a corresponding hardware structure and/or software module for performing each function. A person of ordinary skill in the art should be easily aware that, with reference to the examples described in the embodiments disclosed in this specification, units and algorithm steps can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 9:
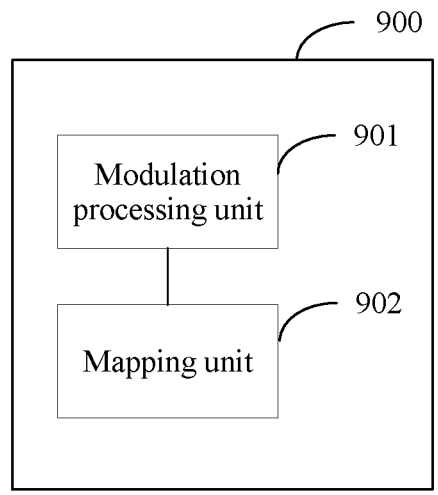
FIG. 9 is a schematic diagram of units of a transmitting device according to an embodiment of this application.

FIG. 9 is a possible schematic diagram of units of a transmitting device used in the foregoing embodiments. The transmitting device 900 includes a modulation processing unit 901 and a mapping unit 902.

The modulation processing unit 901 is configured to generate one layer of modulation symbol sequence based on a stream of bits, where the modulation symbol sequence includes N modulation vectors, any modulation vector $A_i$ includes U modulation symbols, $U \geq 2$, $N \geq i \geq 1$, and N is a positive integer. For an action executed by the modulation processing unit 901, also refer to the detailed description of step S201 shown in FIG. 2. Details are not described herein again.

The mapping unit 902 is configured to process the modulation vector $A_i$ by using a matrix $B_i$ to generate a modulation matrix $y_i$, where each modulation matrix includes T elements in a first dimension, T is a quantity of space domain resources, $T \geq 2$, and the modulation matrix $y_i$ is used to map the stream of bits onto the T space domain resources. For an action executed by the mapping unit 902, also refer to the detailed description of step S202 shown in FIG. 2. Details are not described herein again.

Figure 10:
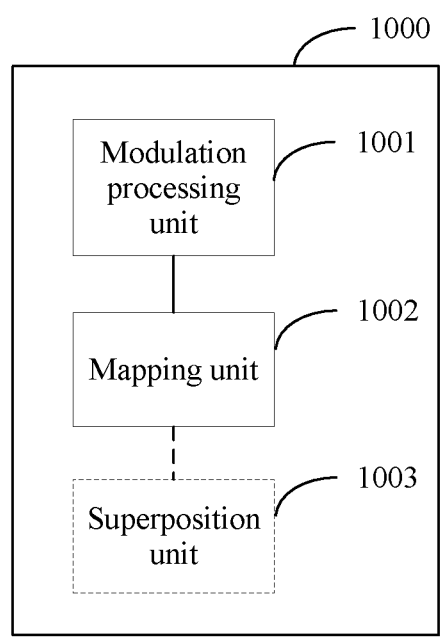
FIG. 10 is a schematic diagram of units of another transmitting device according to an embodiment of this application.

FIG. 10 is a possible schematic diagram of units of another transmitting device used in the foregoing embodiments. As shown in the figure, the transmitting device 1000 includes a modulation processing unit 1001 and a mapping unit 1002.

The modulation processing unit 1001 is configured to generate L layers of modulation symbol sequences based on a stream of bits, where each layer of modulation symbol sequence includes N modulation vectors, any modulation vector $A_i^l$ includes U modulation symbols, L is a positive integer and $L \geq 2$, N is a positive integer and $N \geq i \geq 1$, $U \geq 2$, and l=1 . . . L. For an action executed by the modulation processing unit 1001, also refer to the detailed description of step S701 shown in FIG. 7. Details are not described herein again.

The mapping unit 1002 is configured to process $A_i^l$ by using a matrix $B_i^l$ to generate a modulation matrix $y_i^l$, where each modulation matrix includes T elements in a first dimension, T is a quantity of space domain resources used to transmit the stream of bits, $T \geq 2$, and the modulation matrix $y_i^l$ is used to map the stream of bits onto the T space domain resources. For an action executed by the mapping unit 1002, also refer to the detailed description of step S702 shown in FIG. 7. Details are not described herein again.

Optionally, the transmitting device 1000 may further include a superposition unit 1003. The superposition unit 1003 is configured to superpose the modulation matrices $y_i^l$ that are respectively generated based on the L layers of modulation symbol sequences, to generate a to-be-sent matrix. The to-be-sent matrix includes T element sequences in the first dimension, and the to-be-sent matrix includes i×U element sequences in a second dimension.

Figure 11:
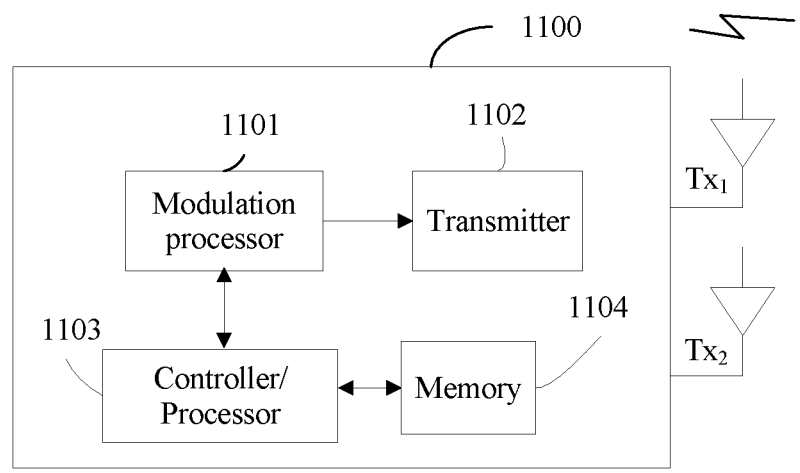
FIG. 11 is a schematic structural diagram of a transmitting device according to an embodiment of this application.

FIG. 11 is a simplified schematic diagram of a design structure of a transmitting device used in the foregoing embodiments. The transmitting device 1100 includes a modulation processor 1101, a transmitter 1102, a controller/processor 1103, a memory 1104, and antennas $Tx_1$ and $Tx_2$.

The modulation processor 1101 processes (for example, performs symbol modulation on) coded service data and a coded signaling message, and provides output sampling. The transmitter 1102 adjusts (for example, performs analog conversion, filtering, amplification, or up-conversion on) the output sampling and generates a to-be-sent signal. The to-be-sent signal is transmitted to a receiving device by using the antennas $Tx_1$ and $Tx_2$. In an example, the modulation processor 1101 is configured to support the transmitting device in performing processes 201 and 202 in FIG. 2; or the modulation processor 1101 is configured to support the transmitting device in performing processes 701, 702, and 703 in FIG. 7.

The controller/processor 1103 controls and manages an action of the transmitting device, and is configured to perform other processing that is performed by the transmitting device in the foregoing embodiments. For example, the controller/processor 1103 is configured to control the transmitting device to process data and/or perform another process of the technology described in this application.

The foregoing antenna can be a physical antenna or a logical port (which can be referred to as an antenna port) corresponding to a reference signal. A plurality of antenna ports can be corresponding to one physical antenna, and this is not limited in this application.

It can be understood that, FIG. 11 shows only a simplified design of the transmitting device. In actual application, the transmitting device can be a terminal or another terminal device, a base station, or another network device. Whether the transmitting device is a terminal or a base station, the transmitting device may include any quantity of transmitters, receivers, processors, controllers, memories, communications units, antennas (that is, T can be greater than 2), and the like, and all transmitting devices that can be configured to implement this application fall within the protection scope of this application.

Figure 12:
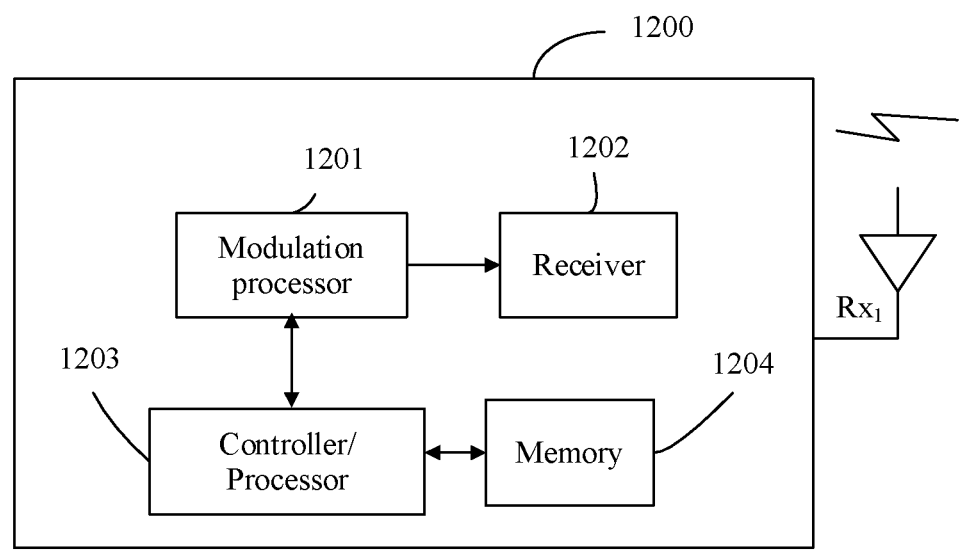
FIG. 12 is a schematic structural diagram of a receiving device according to an embodiment of this application.

FIG. 12 is a simplified schematic diagram of a design structure of a receiving device used in the foregoing embodiments. The receiving device 1200 includes a modulation processor 1201, a receiver 1202, a controller/processor 1203, a memory 1204, and an antenna $Rx_1$.

The receiver 1202 adjusts a signal received from the antenna to provide input sampling. The modulation processor 1201 further processes the input sampling and provides coded data and a coded signaling message that are sent to the receiving device. Specifically, the modulation processor 1201 is configured to support the receiving device in receiving a signal that is from the transmitting device and that is obtained through mapping based on the modulation matrix $y_i$.

The controller/processor 1203 completes corresponding decoding according to a modulation and coding scheme and a mapping manner at each layer, controls and manages an action of the receiving device, and is configured to perform other processing performed by the receiving device in the foregoing embodiments.

It can be understood that, FIG. 12 shows only a simplified design of the receiving device. In actual application, the receiving device can be a terminal, a base station, or another network device. Whether the receiving device is a terminal or a base station, the receiving device may include any quantity of transmitters, receivers, processors, controllers, memories, communications units, antennas (that is, T can be greater than 1), and the like, and all receiving devices that can be configured to implement this application fall within the protection scope of this application.

The modulation processor or the controller/processor configured to perform the methods of the base station or the terminal in the embodiments of this application can be a central processing unit (CPU), a general purpose processor, a digital signal processor (DSP), an application-specific integrated circuit (ASIC), a field programmable gate array (FPGA), another programmable logic device, a transistor logic device, a hardware component, or any combination thereof. The controller/processor may implement or execute various example logical blocks, modules, and circuits described with reference to content disclosed in this application. Alternatively, the processor can be a combination of processors implementing a computing function, for example, a combination of one or more microprocessors, or a combination of the DSP and a microprocessor.

Method or algorithm steps described with reference to the content disclosed in this application can be implemented by hardware, or can be implemented by a processor by executing a software instruction. The software instruction can be formed by a corresponding software module. The software module can be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium can be a component of the processor. The processor and the storage medium can be located in the ASIC. In addition, the ASIC can be located in user equipment. Certainly, the processor and the storage medium may exist in the user equipment as discrete components.

A person skilled in the art should be aware that in the foregoing one or more examples, functions described in this application can be implemented by hardware, software, firmware, or any combination thereof. When the present invention is implemented by software, the foregoing functions can be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium can be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made within the spirit and principle of the present invention shall fall within the protection scope of this application.

What is claimed is:

1. A data processing method, wherein the method comprises:

generating, by a transmitting device, one layer of modulation symbol sequence based on a stream of bits, the modulation symbol sequence comprises N modulation vectors, a modulation vector $A_i$ comprises U modulation symbols, and V non-zero modulation symbols, $U \geq 2$, $N \geq i \geq 1$, and N is a positive integer; and processing, by the transmitting device, $A_i$ by using a matrix $B_i$ to generate a modulation matrix $y_i$, each modulation matrix $y_i$, comprises T elements in a first dimension, T is a quantity of space domain resources, $T \geq 2$, and the modulation matrix $y_i$ is used to map the stream of bits onto the T space domain resources, wherein the matrix $B_i$ comprises T element sequences in the first dimension, at least one of the T element sequences is a non-zero element sequence, the non-zero element sequence comprises at least one non-zero element, the matrix $B_i$ comprises V non-zero element sequences in a second dimension, and $U \geq V \geq 1$;

wherein when the first dimension is a row and T=2, the transmitting device processes the modulation vector $A_i$ based on the matrix $B_i$, processes a modulation vector $A_j$ based on a matrix $B_j$, i is not equal to j, $N \geq j \geq 1$, and $N \geq 2$, $B_i$ is $$\begin{bmatrix} 0 & 1 \\ 0 & 1 \end{bmatrix},$$

and $B_j$ is $$\begin{bmatrix} 1 & 0 \\ 1 & 0 \end{bmatrix}.$$

2. The data processing method according to claim 1, wherein transmitting device further processes a modulation vector $A_m$ based on a matrix $B_m$, m is equal to neither i nor j, $B_m$ is $$\begin{bmatrix} 1 & 0 \\ 0 & 1 \end{bmatrix}$$

or $B_m$ is $$\begin{bmatrix} 0 & 1 \\ 1 & 0 \end{bmatrix},$$

$N \geq m \geq 1$, and $N \geq 3$.

3. The data processing method according to claim 1, wherein the U modulation symbols comprise at least one non-zero modulation symbol and at least one zero modulation symbol.

4. A data processing method, wherein when the first method comprises:

generating, by a transmitting device, L layers of a modulation symbol sequence based on a stream of bits, each layer of the L layers of the modulation symbol sequence comprises N modulation vectors, a modulation vector $A_i^l$ comprises U modulation symbols and V non-zero modulation symbols, L is a positive integer and $L \geq 2$, N is a positive integer and $N \geq i \geq 1$, $U \geq 2$, and $l = 1 \ldots L$; and processing, by the transmitting device, $A_i^l$ using a matrix $B_i^l$ to generate a modulation matrix $y_i^l$, the modulation matrix $y_i^l$ comprises T elements in a first dimension, T is a quantity of space domain resources, $T \geq 2$, and the modulation matrix $y_i^l$ is used to map the stream of bits onto the T space domain resources, when the matrix $B_i^l$ comprises T element sequences in the first dimension, wherein at least one of the T element sequences is a non-zero element sequence, the non-zero element sequence comprises at least one non-zero element, the matrix $B_i^l$ comprises V non-zero element sequences in a second dimension, and $U \geq V \geq 1$, wherein when the first dimension is a row and T=2, the transmitting device processes the modulation vector $A_i^l$ based on the matrix $B_i^l$, processes $A_j^l$ based on a matrix $B_j^l$, i is not equal to j, $N \geq j \geq 1$, and $N \geq 2$, wherein $B_i^l$ is $$\begin{bmatrix} 0 & 1 \\ 0 & 1 \end{bmatrix},$$

and $B_j^l$ is $$\begin{bmatrix} 1 & 0 \\ 1 & 0 \end{bmatrix}.$$

5. The data processing method according to claim 4, wherein the transmitting device further processes a modulation vector $A_m^l$ based on a matrix $B_m^l$, m is equal to neither i nor j, $B_m^l$ is $$\begin{bmatrix} 1 & 0 \\ 0 & 1 \end{bmatrix}$$

or $B_m^l$ is $$\begin{bmatrix} 0 & 1 \\ 1 & 0 \end{bmatrix},$$

$N \geq m \geq 1$, and $N \geq 3$.

6. The data processing method according to claim 4, wherein the method further comprises:

superposing, by the transmitting device, the modulation matrices $y_i^l$ that are generated based on the L layers of modulation symbol sequences, to generate a to-be-sent matrix, wherein the to-be-sent matrix comprises T element sequences in the first dimension, and the to-be-sent matrix comprises i×U element sequences in a second dimension.

7. A transmitting device, comprising:

a memory comprising instructions; and a processor coupled to the memory, wherein the instructions cause the processor to be configured to:

generate one layer of modulation symbol sequence based on a stream of bits, wherein the modulation symbol sequence comprises N modulation vectors, a modulation vector $A_i$ comprises U modulation symbols and V non-zero modulation symbols, $U \geq 2$, $N \geq i \geq 1$, and N is a positive integer; and process $A_i$ by using a matrix $B_i$ to generate a modulation matrix $y_i$, the modulation matrix $y_i$ comprises T elements in a first dimension, T is a quantity of space domain resources, $T \geq 2$, and the modulation matrix $y_i$ is used to map the stream of bits onto the T space domain resources, wherein the matrix $B_i$ comprises T element sequences in the first dimension, at least one of the T element sequences is a non-zero element sequence, the non-zero element sequence comprises at least one non-zero element, the matrix $B_i$ comprises V non-zero element sequences in a second dimension, and $U \geq V \geq 1$, wherein when the first dimension is a row and $T=2$, the modulation vector $A_i$ is processed based on the matrix $B_i$, $A_j$ is processed based on a matrix $B_j$, i is not equal to j, $N \geq j \geq 1$, and $N \geq 2$, wherein $B_i$ is $$\begin{bmatrix} 0 & 1 \\ 0 & 1 \end{bmatrix},$$

and $B_j$ is $$\begin{bmatrix} 1 & 0 \\ 1 & 0 \end{bmatrix}.$$

8. The transmitting device according to claim 7, wherein a modulation vector $A_m$ is processed based on a matrix $B_m$, m is equal to neither i nor j, $B_m$ is $$\begin{bmatrix} 1 & 0 \\ 0 & 1 \end{bmatrix}$$

or $B_m$ is $$\begin{bmatrix} 0 & 1 \\ 1 & 0 \end{bmatrix},$$

$N \geq m \geq 1$, and $N \geq 3$.

9. A transmitting device, comprising:
a memory comprising instructions; and
a processor coupled to the memory, wherein the instructions cause the processor to be configured to:

generate L layers of modulation symbol sequences based on a stream of bits, each layer of L layers of modulation symbol sequence comprises N modulation vectors, a modulation vector $A_i^l$ comprises U modulation symbols and V non-zero modulation symbols, L is a positive integer and $L \geq 2$, N is a positive integer and $N \geq i \geq 1$, $U \geq 2$, and $l=1 \ldots L$; and process $A_i^l$ by using a matrix $B_i^l$ to generate a modulation matrix $y_i^l$, the modulation matrix $y_i^l$ comprises T elements in a first dimension, T is a quantity of space domain resources, $T \geq 2$, and the modulation matrix $y_i^l$ is used to map the stream of bits onto the T space domain resources, wherein the matrix $B_i^l$ comprises T element sequences in the first dimension, at least one of the T element sequences is a non-zero element sequence, the non-zero element sequence comprises at least one non-zero element, the matrix $B_i$ comprises V non-zero element sequences in a second dimension, and $U \geq V \geq 1$, wherein when the first dimension is a row and $T=2$, the modulation vector $A_i$ is processed based on the matrix $B_i$, $A_j$ is processed based on a matrix $B_j$, i is not equal to j, $N \geq j \geq 1$, and $N \geq 2$, wherein $B_i$ is $$\begin{bmatrix} 0 & 1 \\ 0 & 1 \end{bmatrix},$$

and $B_j$ is $$\begin{bmatrix} 1 & 0 \\ 1 & 0 \end{bmatrix}.$$

10. The transmitting device according to claim 9, wherein the instructions cause the processor to be configured to:
superpose the modulation matrices $y_i^l$ that are generated based on the L layers of modulation symbol sequences, to generate a to-be-sent matrix, wherein the to-be-sent matrix comprises T element sequences in the first dimension, and the to-be-sent matrix comprises i×U element sequences in a second dimension.

* * * * *

UNITED STATES PATENT AND TRADEMARK OFFICE
CERTIFICATE OF CORRECTION

PATENT NO. : 10,727,915 B2
APPLICATION NO. : 16/402897
DATED : July 28, 2020
INVENTOR(S) : Wu et al.

Page 1 of 1

It is certified that error appears in the above-identified patent and that said Letters Patent is hereby corrected as shown below:

In the Claims

Claim 1, Column 21, Line 14-15: "each modulation matrix" should read -- the modulation matrix --.

Claim 2, Column 21, Line 43: "wherein transmitting device further processes a modulation" should read -- wherein the transmitting device further processes a modulation --.

Claim 4, Column 21, Line 64-65: "wherein when the first method comprises:" should read -- wherein the method comprises: --.

Claim 4, Column 22, Line 17: "non-zero element sequences ina" should read -- non-zero element sequences in a --.

Claim 7, Column 22, Line 66: "generate one layer of modulation symbol sequence based" should read -- generate one layer of a modulation symbol sequence based --.

Claim 9, Column 24, Line 7: "symbol sequence comprises" should read -- symbol sequences comprises --.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*